US012355732B2

(12) United States Patent
Sarkissian et al.

(10) Patent No.: US 12,355,732 B2
(45) Date of Patent: Jul. 8, 2025

(54) TRANSACTIONAL IDENTITY SYSTEM AND SERVER

(71) Applicant: ID-TX, Inc., Reno, NV (US)

(72) Inventors: Shaunt M. Sarkissian, Reno, NV (US); Dave Campbell, Morgan Hill, CA (US); Armen Grigorayan, Yerevan (AM); Michael Valasanyan, Yerevan (AM)

( * ) Notice: Subject to any disclaimer, the term of this patent is extended or adjusted under 35 U.S.C. 154(b) by 350 days.

(21) Appl. No.: 17/230,601

(22) Filed: Apr. 14, 2021

(65) Prior Publication Data

US 2021/0328973 A1    Oct. 21, 2021

Related U.S. Application Data

(60) Provisional application No. 63/010,227, filed on Apr. 15, 2020.

(51) Int. Cl.
    *H04L 9/40*              (2022.01)

(52) U.S. Cl.
    CPC ................................ *H04L 63/0428* (2013.01)

(58) Field of Classification Search
    CPC .................................................. H04L 63/0428
    USPC .......................................................... 726/26
    See application file for complete search history.

(56) References Cited

U.S. PATENT DOCUMENTS

| | | | | |
|---|---|---|---|---|
| 11,281,800 B2 * | 3/2022 | Riedel | ............... | G06Q 10/10 |
| 11,876,801 B2 * | 1/2024 | Smith | ............... | H04L 9/3265 |
| 11,899,820 B2 * | 2/2024 | Amar | ............... | H04L 9/0637 |
| 2011/0040983 A1 * | 2/2011 | Grzymala-Busse | | G06F 21/6245 |
| | | | | 713/189 |
| 2015/0295906 A1 * | 10/2015 | Ufford | ............... | H04L 63/0815 |
| | | | | 726/6 |
| 2017/0161746 A1 * | 6/2017 | Cook | ............... | H04L 9/14 |
| 2017/0193249 A1 * | 7/2017 | Luria | ............... | H04L 63/0245 |
| 2017/0323291 A1 * | 11/2017 | Donga | ............... | G06Q 20/10 |
| 2017/0359313 A1 * | 12/2017 | Livneh | ............... | H04L 63/0414 |
| 2018/0232536 A1 * | 8/2018 | Fineman | ............. | G06Q 30/0201 |
| 2018/0349993 A1 * | 12/2018 | Straub | ............... | G06Q 50/265 |
| 2019/0319982 A1 * | 10/2019 | Durand | ............... | H04L 63/04 |
| 2020/0007333 A1 * | 1/2020 | Young | ............... | H04L 9/50 |
| 2020/0211002 A1 * | 7/2020 | Steinberg | ............. | G06Q 20/385 |
| 2020/0327540 A1 * | 10/2020 | Chavarria | ............. | G06Q 20/389 |
| 2020/0401728 A1 * | 12/2020 | Lockhart, III | ...... | G06F 21/6263 |
| 2021/0279365 A1 * | 9/2021 | Apsingekar | ......... | G06F 21/6254 |
| 2022/0147653 A1 * | 5/2022 | Pihur | ............... | G06F 21/6245 |

* cited by examiner

*Primary Examiner* — Dant B Shaifer Harriman

(57) ABSTRACT

Disclosed are systems, servers and methods for a novel, multifactor-token based framework for securely executing electronic transactions while protecting user and transactional data related to and/or communicated during the transactions. The disclosed systems and methods enable an on-demand multifactor token to be generated for electronic transactions, whereby the tokens can be specific to a type of transaction, a type of entity and/or other party involved, and the like. The disclosed tokens can be relayed between users and the parties they are interacting with rather than personally identifiable information, which ensures a user's data is securely maintained and prevented from undesired exposure on a network.

4 Claims, 10 Drawing Sheets

TRANSACTIONAL IDENTITY SYSTEM AND SERVER

CROSS-REFERENCE TO RELATED APPLICATIONS

This application claims the benefit of priority from U.S. Provisional Application No. 63/010,227, filed Apr. 15, 2020, entitled "Transactional Identity System and Server," which is incorporated herein by reference in its entirety.

This application includes material that is subject to copyright protection. The copyright owner has no objection to the facsimile reproduction by anyone of the patent disclosure, as it appears in the Patent and Trademark Office files or records, but otherwise reserves all copyright rights whatsoever.

BACKGROUND

In the modern world, most electronic transactions involve a transfer of some form of personal or identifying information. Such information can include, for example, a person's Social Security Number (SSN), birth date, name, biometric data, demographics, username, and the like. Electronic transactions can involve, but are not limited to, property transfers, financial transactions, transactions with merchants or other users, loan applications, credit applications, credit card purchases, and the like. Indeed, even the task of logging into a computer and/or service provider accounts involves the transfer of identifying information.

It is well-recognized that there are serious front-security and transactional risks for transactional models of the sort. Most conventional systems apply symmetric or asymmetric cryptography to protect user information (e.g., SSNs) during and after transactions. However, such transactional models are frequently victims to malicious attacks, as their attack surfaces present opportunities for hackers to expose critical information from the exposed keys relied upon for the applied crypto-functionality. Even the use of hardened devices in the space does not alleviate the deficiencies exposed keys present in preventing transactional modelling in electronic transactions from not being secure.

SUMMARY

Some embodiments of the disclosed systems and methods address the above shortcoming, among others, and provide a novel transaction identity framework for protecting digital identities while processing transactional authentications and payments.

According to some embodiments, the disclosed framework provides new, tokenized identifier (ID) transactional capabilities on and/or over a network. In some embodiments, such capabilities, as discussed below, can be provided while leveraging existing Credit Bureau embedded infrastructure. Thus, in some embodiments, the disclosed framework can operate as an additional security layer provided to existing transactional infrastructures, which enables more secure transactional operations related to the data being processed as well as the entities partaking in the transaction.

In some embodiments, the disclosed framework can be implemented by consumers (also referred to as users, interchangeably), lending entities ("lenders"), financial institutions (FI), and/or any other type of entity, user or operating component or architecture that is involved in and/or is critical to the existing commerce ecosystem upon which the economy is based.

As discussed below, in relation to embodiments of the instant disclosure, the disclosed framework can address the key front-security and transactional risk issues of SSN centric transactional models, and provides real fundamental value to all ecosystem participates. Some embodiments layer highly effectively and can be implemented practically seamlessly within existing commerce, banking and lending ecosystems, and the like. Some embodiments can provide a real, effective bridge to a true federated identity solution and governmental approach of securing identity for all citizens and participants.

Some embodiments of the disclosed framework comprise new, highly secure transactional identity platform services. Some embodiments comprise full traditional ID and credit bureau monitoring capabilities. Some embodiments can eliminate SSN and other critical personally identifiable information (PII) exposure in, for example, key identity, credit and lending, and consumer onboarding transactions.

According to some embodiments, a computing device is disclosed which comprises: one or more processors; and a non-transitory computer-readable memory having stored therein computer-executable instructions, that when executed by the one or more processors, cause the one or more processors to perform operations to receive, over a network, a request to generate a token for a user, the request comprising personally identifiable information (PII) data related to the user; analyze the request, and generate the token, the token being encrypted and securely maintaining the PII data of the user; communicate, over the network, the generated token for storage in association with a network location of the user; initiate an electronic transaction between the user and a third party entity by receiving, over the network, from the third party entity, information related to the token; analyze the token information, and determine validity of the token in relation to an identity of the user; and facilitate, over the network, the electronic transaction between the user and the third party entity based on the validity determination.

In some embodiments, the request further comprises information selected from a groups consisting of: a type of the electronic transaction, another party to the electronic transaction and an amount or consideration involved in the electronic transaction.

In some embodiments, the operations are configured to: parse the request, and analyze the PII data; and determine veracity of PII data in relation to the identity of the user. In some embodiments, the token is generated based on the veracity determination.

In some embodiments, the operations are configured to: store, in a database, the decryption key for the token, wherein the storage is accessible only by the processor, wherein the analysis of the token is based on decryption of the token via the decryption key.

In some embodiments, the network location for storing the generated token is at least one of an account of the user, a device of the user and a network storage associated with the user.

In some embodiments, the received information comprises a version of the token provided to the user. In some embodiments, the received information comprises a network location for retrieval of the token.

In some embodiments, the validity determination operations are configured to: compare PII data included in the token to hosted and verified PII data of the user; and determine a reliability score for the identity of the user and the token based on the comparison.

In some embodiments, the token is configured for use by the user for a plurality of types of electronic transactions. In some embodiments, the token is configured for use by the user for a particular type of electronic transaction. In some embodiments, the token is an on-demand token for use within an electronic transaction with a particular third party entity. In some embodiments, the token is a multifactor security token.

In some embodiments, the device operates as an intermediary on the network for the electronic transaction.

According to some embodiments, a computer-implemented method is disclosed for securely executing electronic transactions while protecting user and transactional data related to and/or communicated during the transactions, as discussed herein.

Some embodiments provide a non-transitory computer-readable storage medium for carrying out the above-mentioned technical steps of the framework's functionality. The non-transitory computer-readable storage medium has tangibly stored thereon, or tangibly encoded thereon, computer readable instructions that when executed by a device (e.g., a server(s)) cause at least one processor to perform a method for securely executing electronic transactions while protecting user and transactional data related to and/or communicated during the transactions, as discussed herein.

In accordance with one or more embodiments, a system is provided that comprises one or more computing devices configured to provide functionality in accordance with such embodiments. In accordance with one or more embodiments, functionality is embodied in steps of a method performed by at least one computing device. In accordance with some embodiments, program code (or program logic) executed by a processor(s) of a computing device to implement functionality in accordance with one or more such embodiments is embodied in, by and/or on a non-transitory computer-readable medium.

DESCRIPTION OF THE DRAWINGS

The foregoing and other objects, features, and advantages of the disclosure will be apparent from the following description of embodiments as illustrated in the accompanying drawings, in which reference characters refer to the same parts throughout the various views. The drawings are not necessarily to scale, emphasis instead being placed upon illustrating principles of the disclosure.

DETAILED DESCRIPTION

Figure 1:
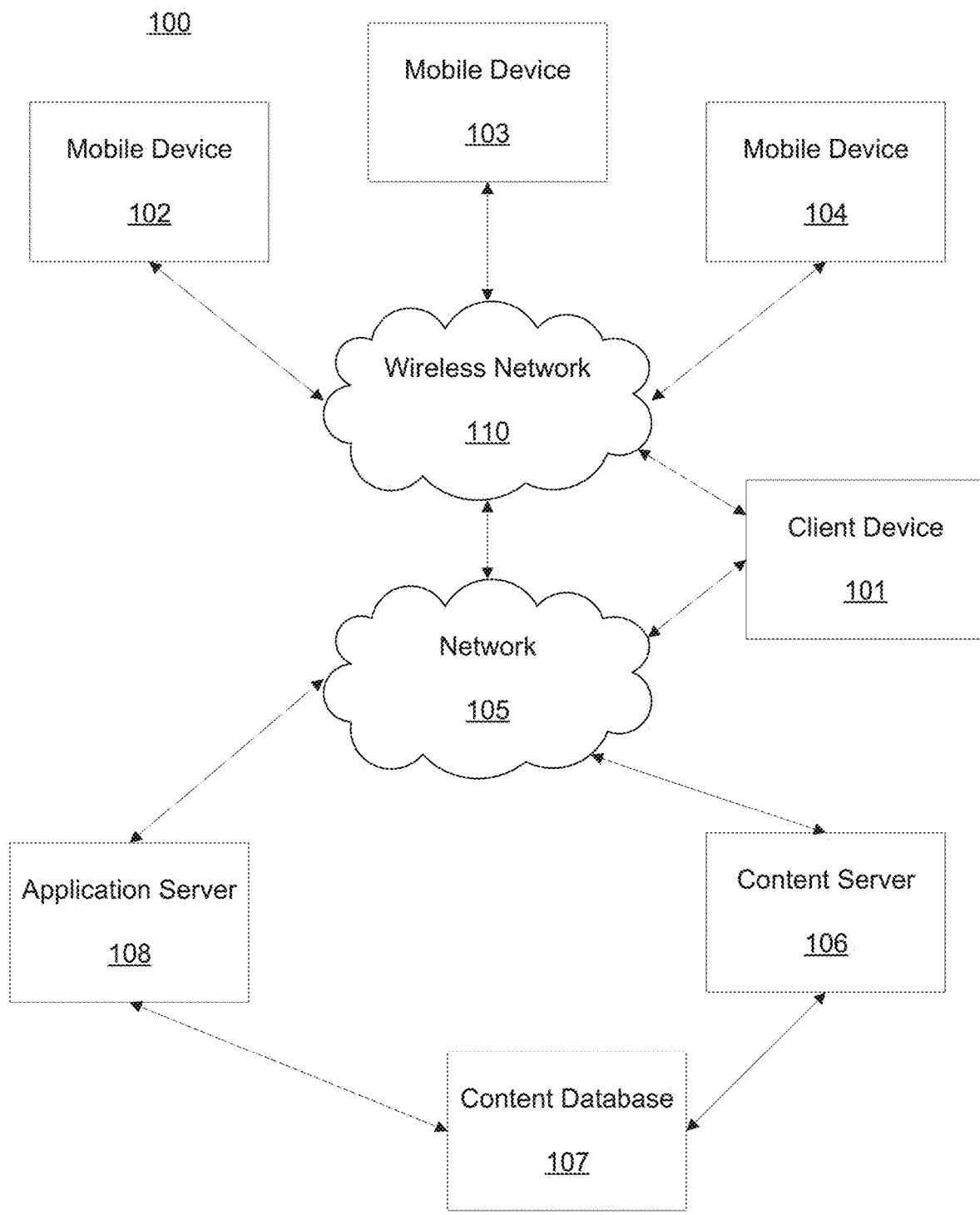
FIG. 1 is a schematic diagram illustrating an example of a network within which the systems and methods disclosed herein could be implemented according to some embodiments of the present disclosure.

The present disclosure will now be described more fully hereinafter with reference to the accompanying drawings, which form a part hereof, and which show, by way of non-limiting illustration, certain example embodiments. Subject matter may, however, be embodied in a variety of different forms and, therefore, covered or claimed subject matter is intended to be construed as not being limited to any example embodiments set forth herein; example embodiments are provided merely to be illustrative. Likewise, a reasonably broad scope for claimed or covered subject matter is intended. Among other things, for example, subject matter may be embodied as methods, devices, components, or systems. Accordingly, embodiments may, for example, take the form of hardware, software, firmware or any combination thereof (other than software per se). The following detailed description is, therefore, not intended to be taken in a limiting sense.

Throughout the specification and claims, terms may have nuanced meanings suggested or implied in context beyond an explicitly stated meaning. Likewise, the phrase "in some embodiments" as used herein does not necessarily refer to the same embodiment and the phrase "in another embodiment" as used herein does not necessarily refer to a different embodiment. It is intended, for example, that claimed subject matter include combinations of example embodiments in whole or in part.

In general, terminology may be understood at least in part from usage in context. For example, terms, such as "and", "or", or "and/or," as used herein may include a variety of meanings that may depend at least in part upon the context in which such terms are used. Typically, "or" if used to associate a list, such as A, B or C, is intended to mean A, B, and C, here used in the inclusive sense, as well as A, B or C, here used in the exclusive sense. In addition, the term "one or more" as used herein, depending at least in part upon context, may be used to describe any feature, structure, or characteristic in a singular sense or may be used to describe combinations of features, structures or characteristics in a plural sense. Similarly, terms, such as "a," "an," or "the," again, may be understood to convey a singular usage or to convey a plural usage, depending at least in part upon context. In addition, the term "based on" may be understood as not necessarily intended to convey an exclusive set of factors and may, instead, allow for existence of additional factors not necessarily expressly described, again, depending at least in part on context.

The present disclosure is described below with reference to block diagrams and operational illustrations of methods and devices. It is understood that each block of the block diagrams or operational illustrations, and combinations of blocks in the block diagrams or operational illustrations, can be implemented by means of analog or digital hardware and computer program instructions. These computer program instructions can be provided to a processor of a general purpose computer to alter its function as detailed herein, a special purpose computer, ASIC, or other programmable data processing apparatus, such that the instructions, which execute via the processor of the computer or other programmable data processing apparatus, implement the functions/acts specified in the block diagrams or operational block or blocks. In some alternate implementations, the functions/acts noted in the blocks can occur out of the order noted in the operational illustrations. For example, two blocks shown in succession can in fact be executed substantially concurrently or the blocks can sometimes be executed in the reverse order, depending upon the functionality/acts involved.

For the purposes of this disclosure, a non-transitory computer readable medium (or computer-readable storage medium/media) stores computer data, which data can include computer program code (or computer-executable instructions) that is executable by a computer, in machine readable form. By way of example, and not limitation, a computer readable medium may comprise computer readable storage media, for tangible or fixed storage of data, or communication media for transient interpretation of code-containing signals. Computer readable storage media, as used herein, refers to physical or tangible storage (as opposed to signals) and includes without limitation volatile and non-volatile, removable and non-removable media implemented in any method or technology for the tangible storage of information such as computer-readable instructions, data structures, program modules or other data. Computer readable storage media includes, but is not limited to, RAM, ROM, EPROM, EEPROM, flash memory or other solid state memory technology, CD-ROM, DVD, or other optical storage, cloud storage, magnetic cassettes, magnetic tape, magnetic disk storage or other magnetic storage devices, or any other physical or material medium which can be used to tangibly store the desired information or data or instructions and which can be accessed by a computer or processor.

For the purposes of this disclosure the term "server" should be understood to refer to a service point which provides processing, database, and communication facilities. By way of example, and not limitation, the term "server" can refer to a single, physical processor with associated communications and data storage and database facilities, or it can refer to a networked or clustered complex of processors and associated network and storage devices, as well as operating software and one or more database systems and application software that support the services provided by the server. Cloud servers are examples.

For the purposes of this disclosure, a "network" should be understood to refer to a network that may couple devices so that communications may be exchanged, such as between a server and a client device or other types of devices, including between wireless devices coupled via a wireless network, for example. A network may also include mass storage, such as network attached storage (NAS), a storage area network (SAN), a content delivery network (CDN) or other forms of computer or machine readable media, for example. A network may include the Internet, one or more local area networks (LANs), one or more wide area networks (WANs), wire-line type connections, wireless type connections, cellular or any combination thereof. Likewise, sub-networks, which may employ differing architectures or may be compliant or compatible with differing protocols, may interoperate within a larger network.

For purposes of this disclosure, a "wireless network" should be understood to couple client devices with a network. A wireless network may employ stand-alone ad-hoc networks, mesh networks, Wireless LAN (WLAN) networks, cellular networks, or the like. A wireless network may further employ a plurality of network access technologies, including Wi-Fi, Long Term Evolution (LTE), WLAN, Wireless Router (WR) mesh, or 2nd, 3rd, $4^{th}$ or $5^{th}$ generation (2G, 3G, 4G or 5G) cellular technology, mobile edge computing (MEC) technology, Bluetooth, 802.11b/g/n, or the like. Network access technologies may enable wide area coverage for devices, such as client devices with varying degrees of mobility, for example.

In short, a wireless network may include any type of wireless communication mechanism by which signals may be communicated between devices, such as a client device or a computing device, between or within a network, or the like.

A computing device may be capable of sending or receiving signals, such as via a wired or wireless network, or may be capable of processing or storing signals, such as in memory as physical memory states, and may, therefore, operate as a server. Thus, devices capable of operating as a server may include, as examples, dedicated rack-mounted servers, desktop computers, laptop computers, set top boxes, integrated devices combining various features, such as two or more features of the foregoing devices, or the like.

For purposes of this disclosure, a client (or consumer or user) device may include a computing device capable of sending or receiving signals, such as via a wired or a wireless network. A client device may, for example, include a desktop computer or a portable device, such as a cellular telephone, a smart phone, a display pager, a radio frequency (RF) device, an infrared (IR) device an Near Field Communication (NFC) device, a Personal Digital Assistant (PDA), a handheld computer, a tablet computer, a phablet, a laptop computer, a set top box, a wearable computer, smart watch, an integrated or distributed device combining various features, such as features of the forgoing devices, or the like.

A client device may vary in terms of capabilities or features. Claimed subject matter is intended to cover a wide range of potential variations, such as a web-enabled client device or previously mentioned devices may include a high-resolution screen (HD or 4K for example), one or more physical or virtual keyboards, mass storage, one or more accelerometers, one or more gyroscopes, global positioning system (GPS) or other location-identifying type capability, or a display with a high degree of functionality, such as a touch-sensitive color 2D or 3D display, for example.

Certain embodiments will now be described in greater detail with reference to the figures. In general, with reference to FIG. 1, a system 100 in accordance with some embodiments of the present disclosure is shown. FIG. 1 shows components of a general environment in which the systems and methods discussed herein may be practiced. Not all the components may be required to practice the disclosure, and variations in the arrangement and type of the components may be made without departing from the spirit or scope of the disclosure. As shown, system 100 of FIG. 1 includes local area networks ("LANs")/wide area networks ("WANs")—network 105, wireless network 110, mobile devices (client devices) 102-104 and client device 101. FIG. 1 additionally includes a variety of servers, such as content server 106 and application (or "App") server 108.

Some embodiments of mobile devices 102-104 may include virtually any portable computing device capable of receiving and sending a message over a network, such as network 105, wireless network 110, or the like. Mobile devices 102-104 may also be described generally as client devices that are configured to be portable. Thus, mobile devices 102-104 may include virtually any portable computing device capable of connecting to another computing device and receiving information, as discussed above.

Mobile devices 102-104 also may include at least one client application that is configured to receive content from another computing device. In some embodiments, mobile devices 102-104 may also communicate with non-mobile client devices, such as client device 101, or the like. In some embodiments, such communications may include sending and/or receiving messages, creating and uploading documents, searching for, viewing and/or sharing memes, photographs, digital images, audio clips, video clips, or any of a variety of other forms of communications.

Client devices 101-104 may be capable of sending or receiving signals, such as via a wired or wireless network, or may be capable of processing or storing signals, such as in memory as physical memory states, and may, therefore, operate as a server.

In some embodiments, wireless network 110 is configured to couple mobile devices 102-104 and its components with network 105. Wireless network 110 may include any of a variety of wireless sub-networks that may further overlay stand-alone ad-hoc networks, and the like, to provide an infrastructure-oriented connection for mobile devices 102-104.

In some embodiments, network 105 is configured to couple content server 106, application server 108, or the like, with other computing devices, including, client device 101, and through wireless network 110 to mobile devices 102-104. Network 105 is enabled to employ any form of computer readable media or network for communicating information from one electronic device to another.

In some embodiments, the content server 106 may include a device that includes a configuration to provide any type or form of content via a network to another device. Devices that may operate as content server 106 include personal computers, desktop computers, multiprocessor systems, microprocessor-based or programmable consumer electronics, network PCs, servers, and the like. In some embodiments, content server 106 can further provide a variety of services that include, but are not limited to, email services, financial services, instant messaging (IM) services, streaming and/or downloading media services, search services, photo services, web services, social networking services, news services, third-party services, audio services, video services, SMS services, MMS services, FTP services, voice over IP (VOIP) services, or the like. Such services, for example the email services and email platform, can be provided via the message server 120.

In some embodiments, users are able to access services provided by servers 106 and 108. This may include in a non-limiting example, authentication servers, search servers, email servers, social networking services servers, SMS servers, IM servers, MMS servers, exchange servers, photo-sharing services servers, and travel services servers, via the network 105 using their various devices 101-104.

In some embodiments, application server 108, for example, can store various types of applications and application related information including application data and user profile information (e.g., identifying, generated and/or observed information associated with a user).

In some embodiments, content server 106 and app server 108 can store various types of data related to the content and services each provide, observe, identify, determine, generate, modify, retrieve and/or collect. Such data can be stored in an associated content database 107, as discussed in more detail below.

In some embodiments, server 106 and/or 108 can be embodied as a cloud server or configured for hosting cloud services, as discussed herein.

In some embodiments, the network 105 is also coupled with/connected to a Trusted Search Server (TSS) which can be utilized to render content in accordance with the embodiments discussed herein. Embodiments exist where the TSS functionality can be embodied within servers 106 and 108.

Moreover, although FIG. 1 illustrates servers 106 and 108 as single computing devices, respectively, the disclosure is not so limited. For example, one or more functions of servers 106 and 108 may be distributed across one or more distinct computing devices. Moreover, in some embodiments, servers 106 and 108 may be integrated into a single computing device, without departing from the scope of the present disclosure.

Additionally, while the illustrated embodiment in FIG. 1 depicts only servers 106 and 108, it should not be construed as limiting, as any type and number of servers can be included therein.

Figure 2:
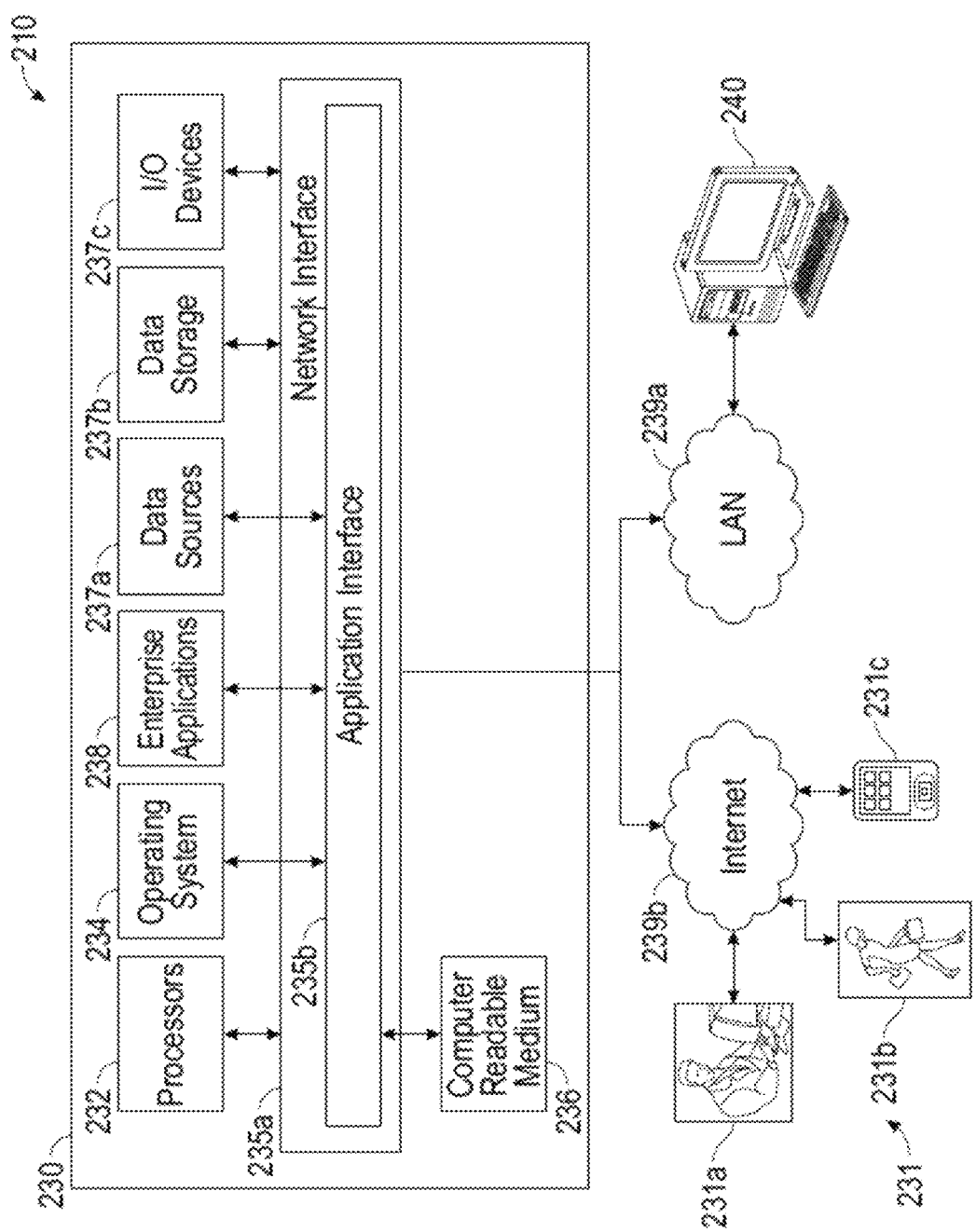
FIG. 2 is a schematic diagram illustrating an example of a network within which the systems and methods disclosed herein could be implemented according to some embodiments of the present disclosure.

Turning to FIG. 2, computer system 210 is depicted and is a non-limiting example embodiment of system 100 discussed above in relation to FIG. 1.

FIG. 2 illustrates a computer system 210 enabling or operating an embodiment of system 100 of FIG. 1, as discussed below. In some embodiments, computer system 210 can include and/or operate and/or process computer-executable code of one or more of the above-mentioned program logic, software modules, and/or systems. Further, in some embodiments, the computer system 210 can operate and/or display information within one or more graphical user interfaces. In some embodiments, the computer system 210 can comprise a cloud server and/or can be coupled to one or more cloud-based server systems.

In some embodiments, the system 210 can comprise at least one computing device 230 including at least one processor 232. In some embodiments, the at least one processor 232 can include a processor residing in, or coupled to, one or more server platforms. In some embodiments, the system 210 can include a network interface 235a and an application interface 235b coupled to the least one processor 232 capable of processing at least one operating system 234. Further, in some embodiments, the interfaces 235a, 235b coupled to at least one processor 232 can be configured to process one or more of the software modules 238 (e.g., such as enterprise applications). In some embodiments, the software modules 238 can include server-based software, and can operate to host at least one user account and/or at least one client account, and operating to transfer data between one or more of these accounts using the at least one processor 232.

With the above embodiments in mind, it should be understood that some embodiments can employ various computer-implemented operations involving data stored in computer systems. Moreover, the above-described databases and models described throughout can store analytical models and other data on computer-readable storage media within the system 210 and on computer-readable storage media coupled to the system 210. In addition, the above-described applications of the system can be stored on non-transitory computer-readable storage media within the system 210 and on computer-readable storage media coupled to the system 210.

In some embodiments, the system 210 can comprise at least one non-transitory computer readable medium 236 coupled to at least one data source 237a, and/or at least one data storage device 237b, and/or at least one input/output device 237c. In some embodiments, the disclosed systems and methods can be embodied as computer readable code on a computer readable medium 236. In some embodiments, the computer readable medium 236 can be any data storage device that can store data, which can thereafter be read by a computer system (such as the system 210). In some embodiments, the computer readable medium 236 can be any physical or material medium that can be used to tangibly store the desired information or data or instructions and which can be accessed by a computer or processor 232. In some embodiments, at least one of the software modules 238 can be configured within the system to output data to at least one user 231 via at least one graphical user interface rendered on at least one digital display.

In some embodiments, the non-transitory computer readable medium 236 can be distributed over a conventional computer network via the network interface 235a where the system embodied by the computer readable code can be stored and executed in a distributed fashion. For example, in some embodiments, one or more components of the system 210 can be coupled to send and/or receive data through a local area network ("LAN") 239a and/or an internet coupled network 239b (e.g., such as a wireless internet). In some further embodiments, the networks 239a, 239b can include wide area networks ("WAN"), direct connections (e.g., through a universal serial bus port), or other forms of computer-readable media 236, or any combination thereof.

In some embodiments, components of the networks 239a, 239b can include any number of user devices such as personal computers including for example desktop computers, and/or laptop computers, or any fixed, generally non-mobile internet appliances coupled through the LAN 239a. For example, some embodiments include personal computers 240a coupled through the LAN 239a that can be configured for any type of user including an administrator. Other embodiments can include personal computers coupled through network 239b. In some further embodiments, one or more components of the system 210 can be coupled to send or receive data through an internet network (e.g., such as network 239b). For example, some embodiments include at least one user 231 coupled wirelessly and accessing one or more software modules of the system including at least one enterprise application 238 via an input and output ("I/O") device 237c. In some other embodiments, the system 210 can enable at least one user 231 to be coupled to access enterprise applications 238 via an I/O device 237c through LAN 239a. In some embodiments, the user 231 can comprise a user 231a coupled to the system 210 using a desktop computer, and/or laptop computers, or any fixed, generally non-mobile internet appliances coupled through the internet 239b. In some embodiments, the user 231 can comprise a mobile user 231b coupled to the system 210. In some embodiments, the user 231b can use any mobile computing device 231c to wirelessly coupled to the system 210, including, but not limited to, personal digital assistants, and/or cellular phones, mobile phones, or smart phones, and/or pagers, and/or digital tablets, and/or fixed or mobile internet appliances.

Figure 3:
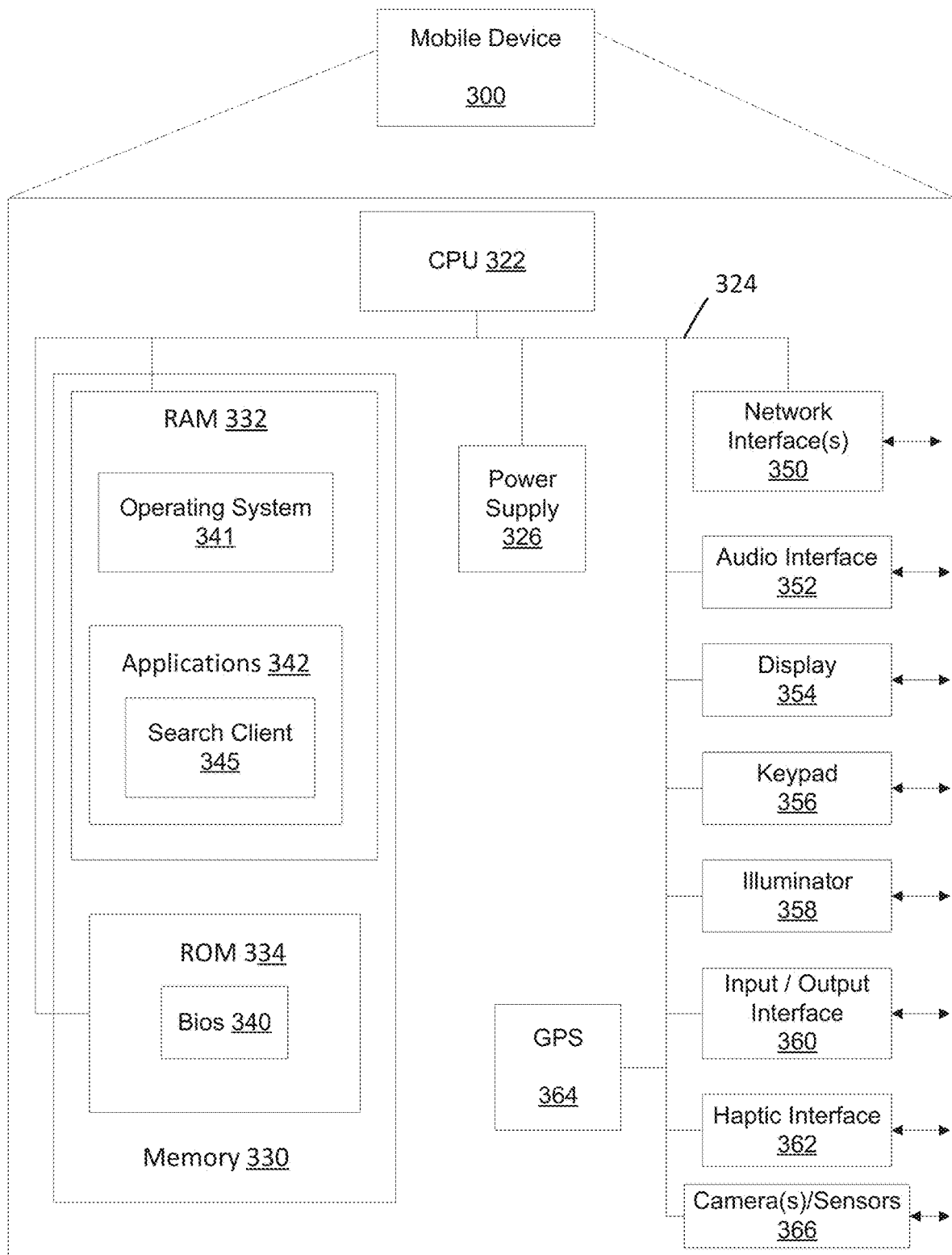
FIG. 3 depicts is a schematic diagram illustrating an example of client device according to some embodiments of the present disclosure.

FIG. 3 is a schematic diagram illustrating a client device showing an example embodiment of a client device that may be used within the present disclosure. Client device 300 may include many more or fewer components than those shown in FIG. 3. However, the components shown are sufficient to disclose an illustrative embodiment for implementing the present disclosure. Client device 300 may represent, for example, client devices discussed above in relation to FIGS. 1-2.

As shown in FIG. 3, in some embodiments, client device 300 includes a processing unit (CPU) 322 in communication with a mass memory 330 via a bus 324. In some embodiments, client device 300 also includes a power supply 326, one or more network interfaces 350, an audio interface 352, a display 354, a keypad 356, an illuminator 358, an input/output interface 360, a haptic interface 362, an optional global positioning systems (GPS) receiver 364 and a camera(s) or other optical, thermal or electromagnetic sensors 366. Device 300 can include one camera/sensor 366, or a plurality of cameras/sensors 366, as understood by those of skill in the art. Power supply 326 provides power to the client device 300.

Client device 300 may optionally communicate with a conventional base station (not shown), or directly with another computing device. Network interface 350 is sometimes known as a transceiver, transceiving device, or network interface card (NIC).

In some embodiments, audio interface 352 is arranged to produce and receive audio signals such as the sound of a human voice. Display 354 may be a liquid crystal display (LCD), gas plasma, light emitting diode (LED), or any other type of display used with a computing device. Display 354 may also include a touch sensitive screen arranged to receive input from an object such as a stylus or a digit from a human hand.

Keypad 356 may comprise any input device arranged to receive input from a user. Illuminator 358 may provide a status indication and/or provide light.

In some embodiments, client device 300 also comprises input/output interface 360 for communicating with external. Input/output interface 360 can utilize one or more communication technologies, such as USB, infrared, Bluetooth™, or the like. In some embodiments, haptic interface 362 is arranged to provide tactile feedback to a user of the client device.

Optional GPS transceiver 364 can determine the physical coordinates of client device 300 on the surface of the Earth, which typically outputs a location as latitude and longitude values. GPS transceiver 364 can also employ other geo-positioning mechanisms, including, but not limited to, triangulation, assisted GPS (AGPS), E-OTD, CI, SAI, ETA, BSS or the like, to further determine the physical location of Client device 300 on the surface of the Earth. In some embodiments, however, the client device 300 may through other components, provide other information that may be employed to determine a physical location of the device, including for example, a MAC address, Internet Protocol (IP) address, or the like.

In some embodiments, mass memory 330 includes a RAM 332, a ROM 334, and other storage means. Mass memory 330 illustrates another example of computer storage media for storage of information such as computer readable instructions, data structures, program modules or other data. Mass memory 330 stores a basic input/output system ("BIOS") 340 for controlling low-level operation of client device 300. The mass memory also stores an operating system 341 for controlling the operation of client device 300.

In some embodiments, memory 330 further includes one or more data stores, which can be utilized by client device 300 to store, among other things, applications 342 and/or other information or data. For example, data stores may be employed to store information that describes various capabilities of client device 300. The information may then be provided to another device based on any of a variety of events, including being sent as part of a header (e.g., index file of the HLS stream) during a communication, sent upon request, or the like. At least a portion of the capability information may also be stored on a disk drive or other storage medium (not shown) within client device 300.

In some embodiments, applications 342 may include computer executable instructions which, when executed by client device 300, transmit, receive, and/or otherwise process audio, video, images, and enable telecommunication with a server and/or another user of another client device. In some embodiments, applications 342 may further include search client 345 that is configured to send, to receive, and/or to otherwise process a search query and/or search result.

Having described the components of the general architecture employed within some embodiments, the components' general operation with respect to some embodiments will now be described below.

Figure 4:
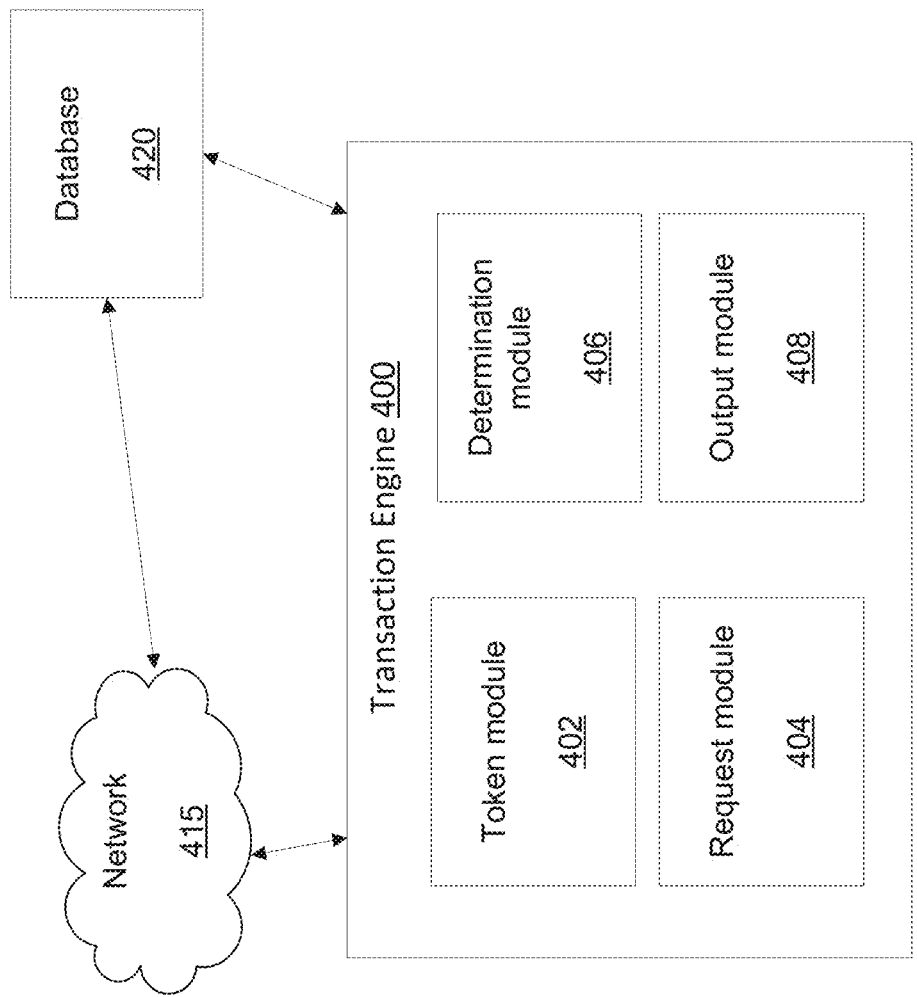
FIG. 4 is a block diagram illustrating components of an exemplary system according to some embodiments of the present disclosure.

FIG. 4 is a block diagram illustrating the components of some embodiments. FIG. 4 includes transaction engine 400, network 415 and database 420. The user interface (UI) engine 400 can be a special purpose machine or processor and could be hosted by a cloud server (e.g., cloud web services server(s)), application server, content server, web server, search server, content provider, third party server, user's computing device, and the like, or any combination thereof.

According to some embodiments, transaction engine 400 can be embodied as a stand-alone application that executes on a server and/or user device (e.g., on a cloud server and/or on-prem on a user device or local storage). In some embodiments, the transaction engine 400 can function as an application installed on a device; and, in some embodiments, such application can be a web-based application accessed by a device over a network.

The database 420 can be any type of database or memory and can be associated with a content server on a network (e.g., cloud server, content server, a search server or application server) or a user's device (e.g., client devices discussed above in FIGS. 1-3). Database 420 comprises a dataset of data and metadata associated with local and/or network information related to users, services, applications, content and the like. Such information can be stored and indexed in the database 420 independently and/or as a linked or associated dataset. As discussed above, it should be understood that the data (and metadata) in the database 420 can be any type of information and type, whether known or to be known, without departing from the scope of the present disclosure.

According to some embodiments, database 420 can store data and metadata associated with users, user accounts, transactions, tasks, assets, files, events, schedules, images, videos, text, messages, products, items and services from an assortment of financial, institutional, personal, media and/or service providers and/or platforms, and the like. It should be understood that the data (and metadata) in the database 420 can be any type of information related to a user, a user's account, a user's transactions, the institution being interacted with and/or acting as an intermediary or escrow for a transaction, a device, an application, a service provider, a content provider, whether known or to be known, without departing from the scope of the present disclosure.

As discussed above, with reference to FIGS. 1-2, the network 415 can be any type of network such as, but not limited to, a wireless network, a local area network (LAN), wide area network (WAN), the Internet, or a combination thereof. The network 415 facilitates connectivity of the transaction engine 400, and the database of stored resources 420. Indeed, as illustrated in FIG. 4, the transaction engine 400 and database 420 can be directly connected by any known or to be known method of connecting and/or enabling communication between such devices and resources.

The principal processor, server, or combination of devices that comprises hardware programmed in accordance with the special purpose functions herein is referred to for convenience as transaction engine 400, and includes token module 402, request module 404, determination module 406 and output module 408. It should be understood that the engine(s) and modules discussed herein are non-exhaustive, as additional or fewer engines and/or modules (or submodules) may be applicable to the embodiments of the systems and methods discussed. The operations, configurations and functionalities of each module, and their role within embodiments of the present disclosure will be discussed below.

Turning now to FIGS. 5-8, systems 500-800, respectively, provide non-limiting example embodiments for integration and operation of the transaction engine 400 within example ecosystems.

Figure 5:
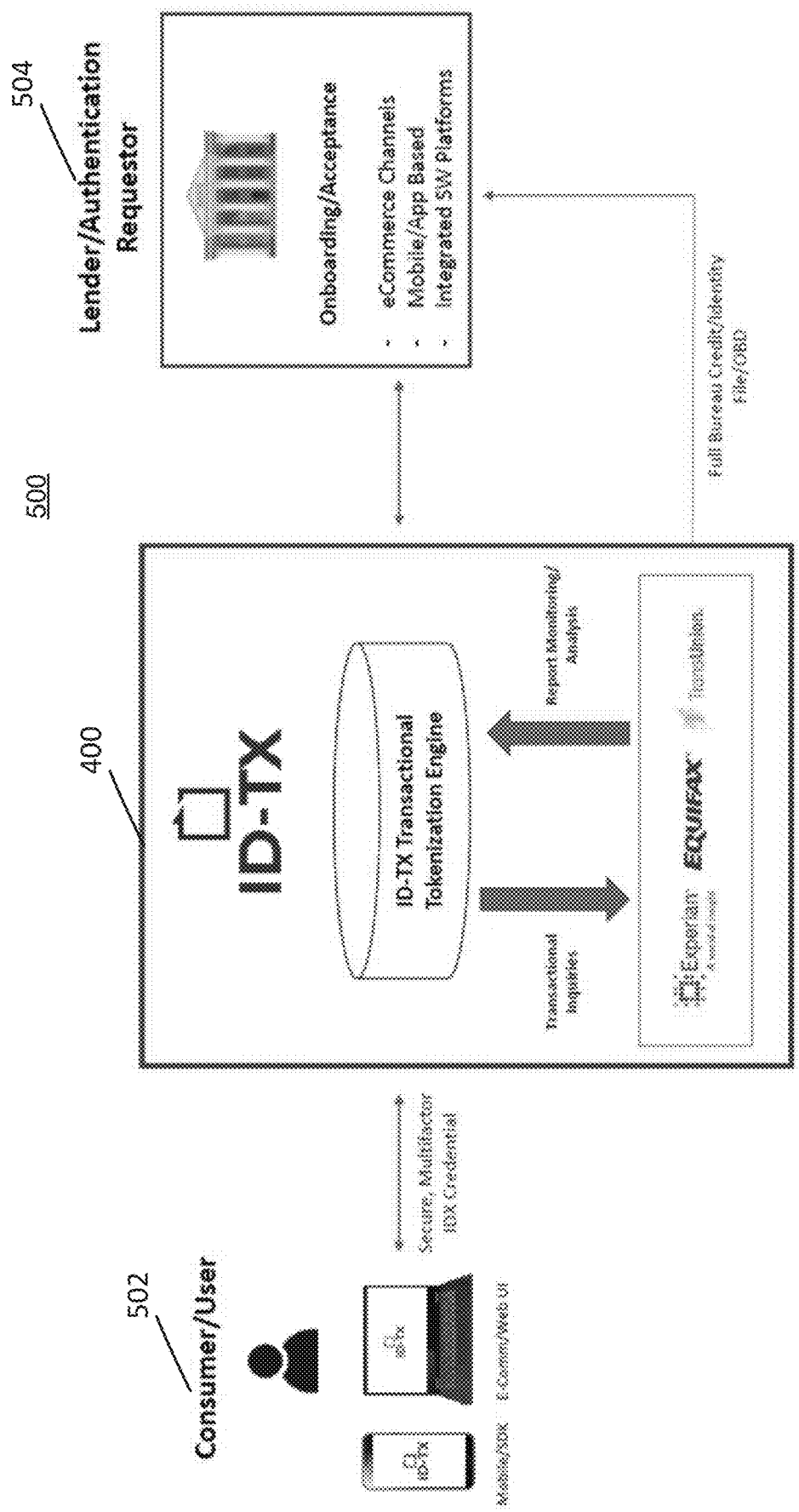
FIG. 5 illustrates a non-limiting example embodiments of the disclosed framework according to some embodiments of the present disclosure.

FIG. 5 illustrates a non-limiting example embodiments of the disclosed framework according to some embodiments of the present disclosure. As illustrated, system 500 includes consumer 502, transaction engine 400 and a third party entity 504 (e.g., a lender/authentication requestor). In some embodiments, a consumer 502 can utilize a mobile/SDK phone, a laptop comprising one or more E-Commerce/Web UIs, and the like to access the system 500. In some embodiments, a consumer 502 can utilize their mobile phone and/or laptop for the transfer of secure, multifactor credentials, and the like to the system 500.

In some embodiments, the system 500 can comprise transaction inquiries and can report monitoring and analysis. In some embodiments, transaction inquires can be sent to third party entities 504 (e.g., credit bureaus, for example, Experian®, Equifax®, TransUnion® and the like).

In some embodiments, the system 500 can provide the lender, authentication requestor and similar parties the analysis from the credit bureaus. In some embodiments, the system 500 can transfer the full bureau credit history, identity file, and required onboarding data of the consumer to the lender, authentication requestor, and the like.

In some embodiments the lender and/or authentication requestor 504 can provide onboarding and acceptance. In some embodiments, the lender and/or authentication requestor can utilize eCommerce channels, can be mobile App based, and can integrate software platforms.

According to some embodiments, as illustrated in FIG. 5, system 500 provides a general overview of how transaction engine 400 acts as a secure intermediary for secure, electronic transactions with a requestor 504. In some embodiments, consumer 502, via their device (e.g., as discussed above and in relation to FIG. 3) can request and receive a secure, multifactor credential (e.g., a token, as discussed below). Transaction engine 400 receives this request from consumer 502, generates/compiles the token, and returns it. In some embodiments, the request can include verifying information for the consumer 502, which can include, but is not limited to, a user name, biometric information, SSN, and the like.

In some embodiments, upon generating and providing the token to the consumer 502, engine 400 can act as a proxy, or a "VPN" like intermediary that relays tokens to third party entities 504, so that critical and personal user data of the consumer is never revealed to the third party. Thus, rather than the consumer providing his/her personal data over a network and/or to third parties, the secure and verified token is exposed, as discussed in more detail below.

Figure 6:
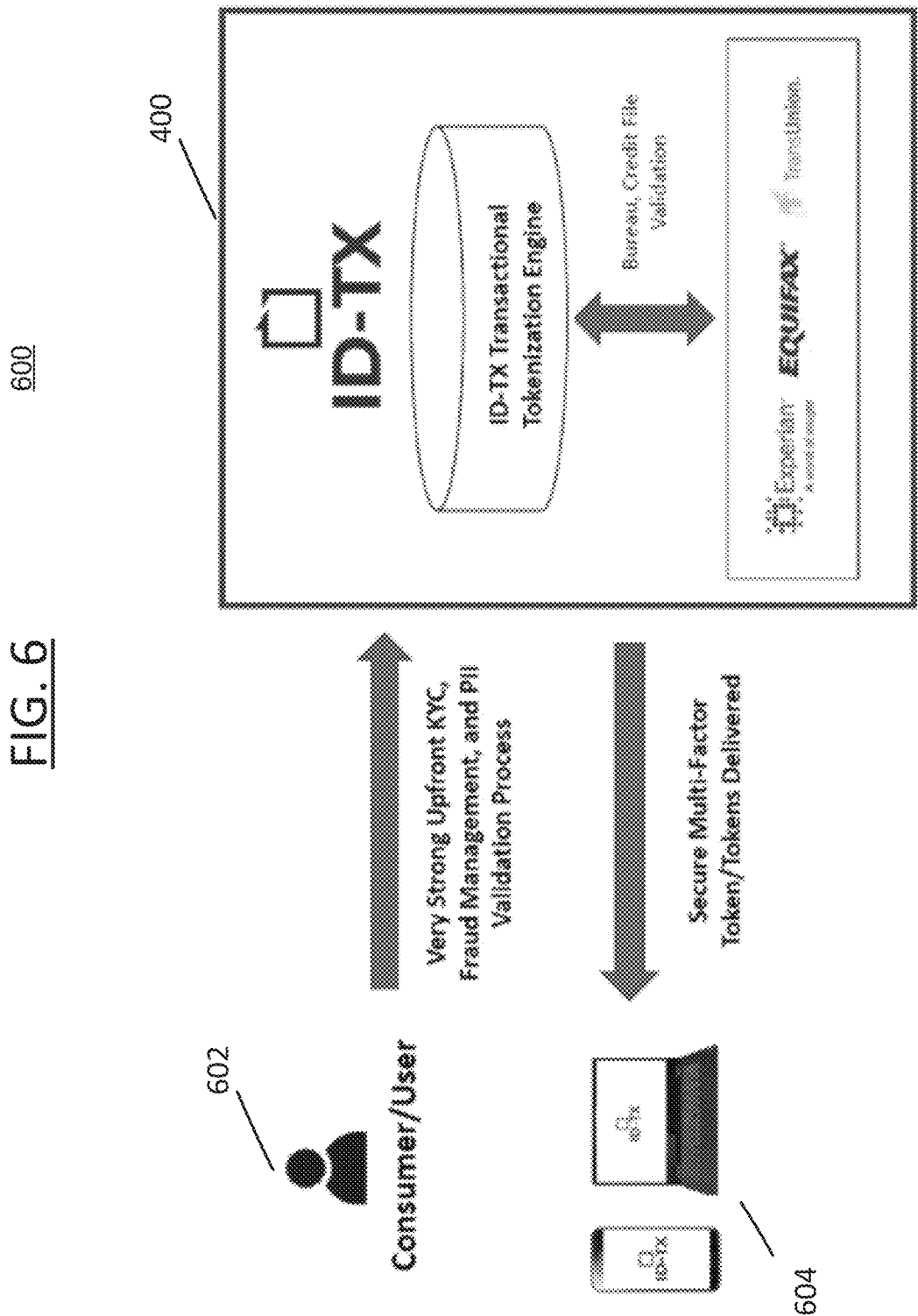
FIG. 6 illustrates a non-limiting example embodiments of an validation operation according to some embodiments of the present disclosure.

FIG. 6 illustrates a non-limiting example embodiments of an validation operation according to some embodiments of the present disclosure. In some embodiments, system 600 can utilize new ledge edge frauds management, authentication, and know your customer capabilities to deliver fundamentally improved transactional integrity and trusted commerce framework. Some embodiments can leverage leading edge securing, know your customer, and onboarding fraud management processes and multifactor authentication. Some embodiments can streamline client onboarding and enrollment while increasing transaction integrity and reducing fraud.

As illustrated in example embodiment FIG. 6, system 600 includes a consumer, consumer device 604 (similar to devices discussed above in relation to at least FIG. 3) and engine 400.

In some embodiments, a consumer 602 can utilize a strong upfront know your customer (KYC), fraud management, and PII validation process to transfer information to engine 400. In some embodiments, engine 400 can provide a secure multifactor token and can deliver tokens to the consumer devices 604 (e.g., mobile phone, laptop, and the like). In some embodiments, engine 400 can involve operations for sharing and validating credit and/or other personal information of the consumer 602.

According to some embodiments, a non-limiting validation operation involves a consumer signing up and/or enrolling with engine 400. This involves, as discussed herein, generation of a secure token for the user. In some embodiments, consumer 802 sends a request to engine 400 for a verified, secure token. The request can be entered via device 604. In response, engine 400 analyzes the information provided by consumer 602, which as discussed above, can involve the verification of such information with credit agencies, and determines the veracity and validity that "the user says who she says she is". If validated as a "true" identity, the consumer 602 has a token generated for his/her identity, which as discussed below, can be used as an identifier for future transactions.

In some embodiments, the token, which can be a multifactor security token, or any other type of encrypted, identifiable object, is sent to the consumer 602 by engine 400. As discussed below, engine 400 can generate the token using any type of known or to be known multifactor authentication (MFA) algorithm. In some embodiments, the token can comprise the information related to the consumer (e.g., SSN), and in some embodiments, the token can comprise an indication that the consumer is verified without providing the SSN, thereby securely maintaining the SSN offline (or out of the transaction). In some embodiments, tokens can be specific to a type of transaction and/or a type of third party entity the consumer is interacting with, as discussed below in relation to at least FIG. 8. In some embodiments, tokens can be stored in and/or associated with a consumer's device 604 or an account of a consumer 602. This enables requests originating from such pre-validated devices to be authenticated and approved in a more streamlined manner, rather than tokens having to be retrieved from a network resource (e.g., stored in a secure cloud).

In some embodiments, the token can have a predetermined time period of expiration, and in some embodiments, the expiration can be tied to a number of times it can be used before it expires. In some embodiments, the token can also include information preventing a user from interacting with known "bad actors". For example, a token can be generated and if/when it is sent to an entity that is known to be a hacker or other bad actor, the token can either self-destruct or prevent it from being decrypted.

Figure 7A:
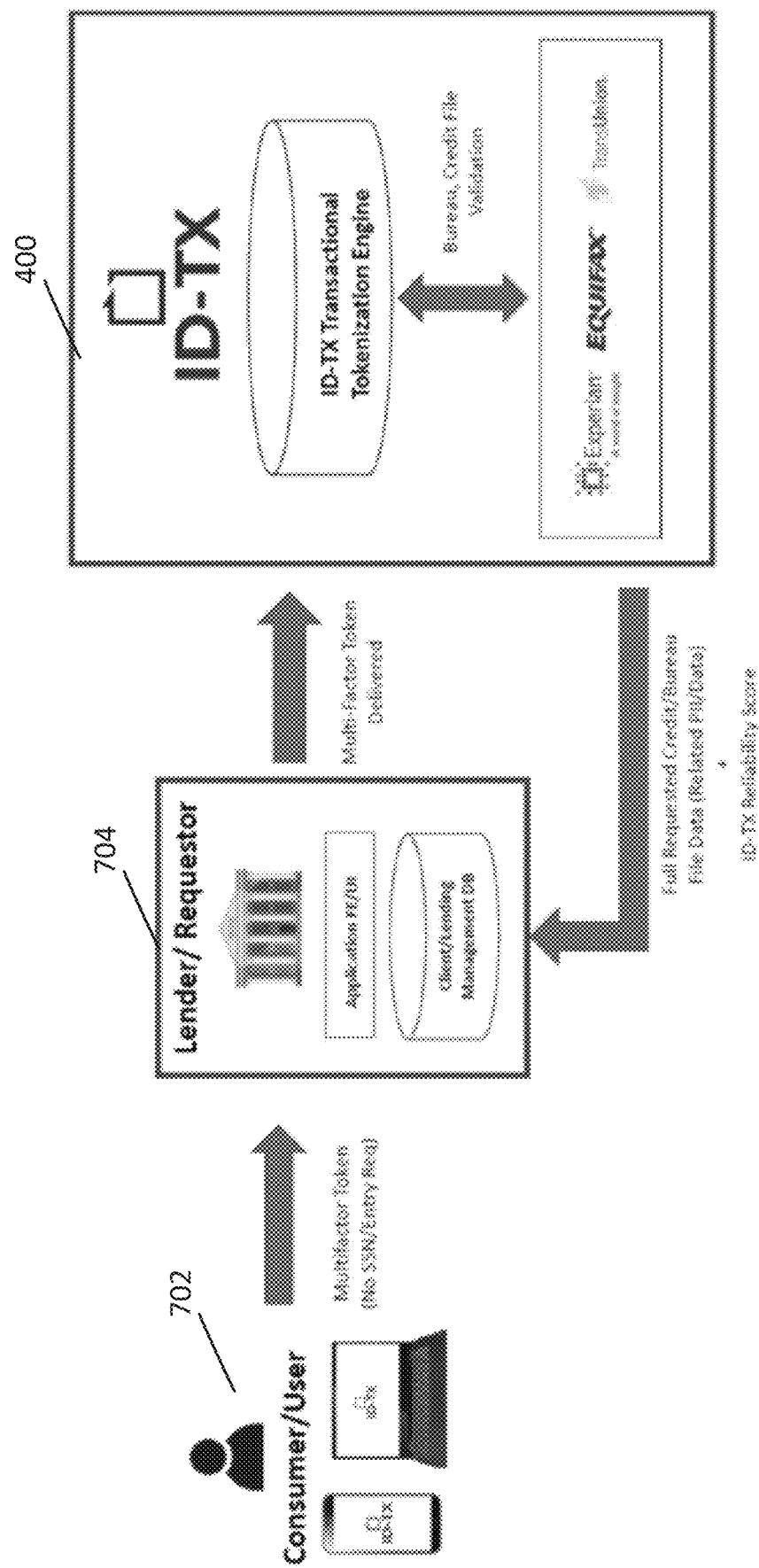
FIGS. 7A-7B provide non-limiting example embodiments of transactional processing according to some embodiments of the present disclosure.
Figure 7B:
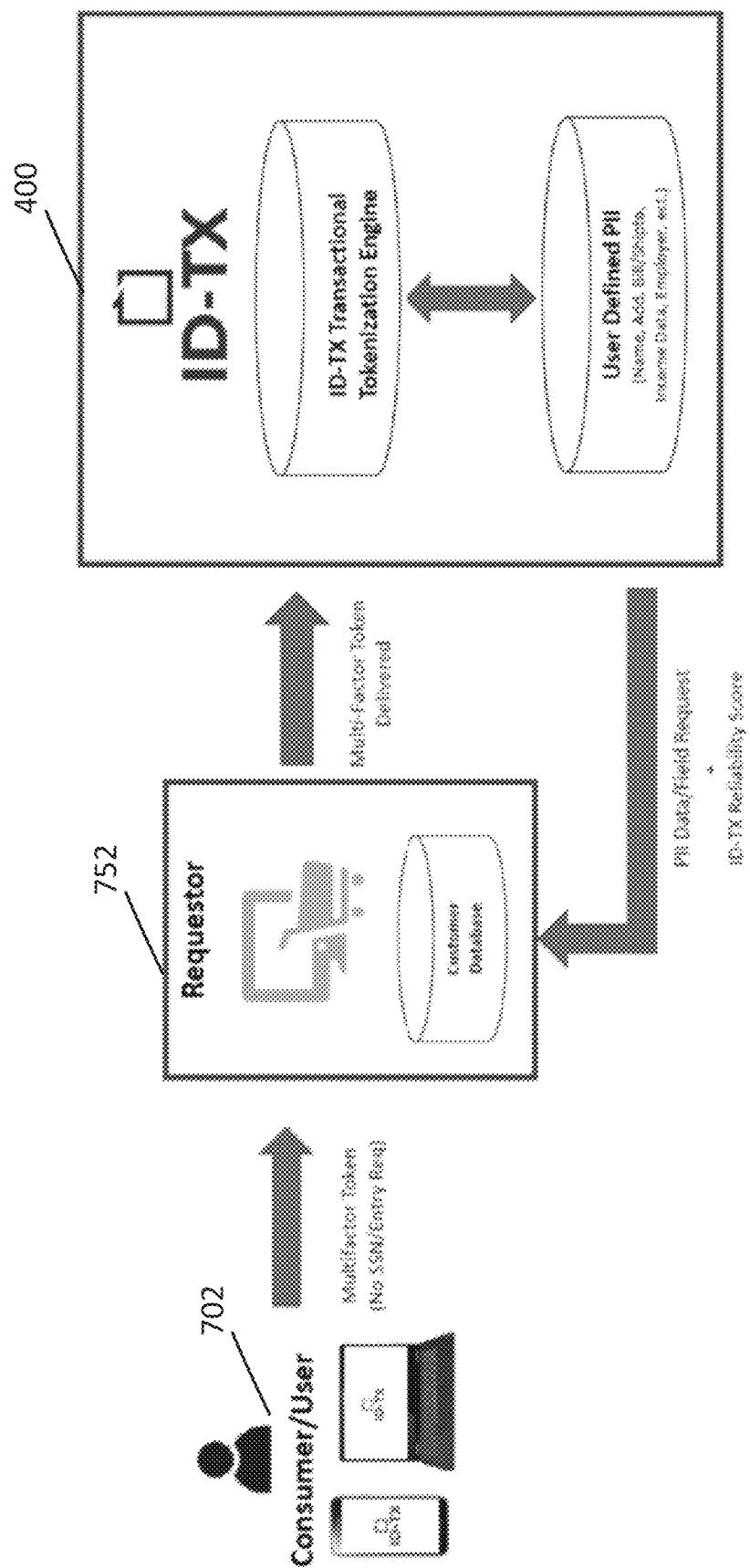

FIGS. 7A-7B provide non-limiting example embodiments of transactional processing according to some embodiments of the present disclosure. FIG. 7A illustrates a consumer 702 performing a transaction with lender/requestor entity 704 (e.g., a consumer ID/credit request, for example); and FIG. 7B illustrates consumer 702 performing a transaction with requestor entity 752 (e.g., a PII transaction, for example).

As discussed herein, FIGS. 7A and 7B provide systems 700 and 750, respectively, which depict example embodiments of transaction processing using a token of a consumer 702. The token having been generated by engine 400, as discussed above. In some embodiments, the multifactor token (or multifactor security token, used interchangeably) can comprise identifying information of a consumer, for example, social security numbers and the like.

As illustrated in FIG. 7A, a lender 704 can receive a token from consumer 702 and provide the multifactor token information to the engine 400, as illustrated in FIG. 7A. In some embodiments, in response to receiving the token, engine 400 can provide a lender 704 with the full requested credit and bureau file data (related to PII/data) and provide a reliability score (e.g., which can be computed by engine 400, as discussed below), as illustrated in FIG. 7A. In some embodiments, the lender 704 can use the consumer's credit bureau file data for application approval, consumer lending management, and the like, for authenticating and executing a transaction with consumer 702.

FIG. 7B provides another non-limiting example in a similar manner as FIG. 7A. In some embodiments, a requestor 752 can receive a token from consumer 702 and provide the multifactor token information to the engine 400, as illustrated in FIG. 7B. In some embodiments, in response to receiving the token, engine 400 can provide a requestor 752 with the PII data, and provide a computed reliability score, as illustrated in FIG. 7B. In some embodiments, the requestor 752 can use the consumer's credit bureau file data for application approval, consumer lending management, and the like, for authenticating and executing a transaction with consumer 702.

In some embodiments, engine 400 can provide services to large credit bureaus and Social Security Number centric platforms which can dominate the landscape. In some embodiments, blockchain, Distributed Ledger Technology and crowdsourced platforms can comprise unrealistic or zero real world applications. In some embodiments, weak Social Security Number centric solutions can require monitoring and constant vigilance.

Thus, as illustrated in FIG. 7A-7B, engine 400 can be leveraged by third party entities (704, 752) to confirm an identity of a consumer 702 for the performance of a transaction. The confirmation is performed via analysis of the multifactor token the consumer 702 provides to initiate the transaction and/or at least verify his/her identity. Engine 400 can analyze the token to ensure it has not been tampered with and/or that it is not fraudulent, confirm its accuracy and determine a reliability score, which is then sent back to the requesting entity (704, 752).

In some embodiments, the reliability score is determined based on a number of factors, including, but not limited to, how many credentials the token comprises, how many matches within PII sources (e.g., credit bureau), and the like. The score may also be based on a type of information included in and/or referenced in the token.

For example, a consumer's token comprises a name, social security number and password. In some example embodiments, since there are three viable types of PII data included/referenced by the token, this may satisfy a threshold (e.g., 3 types of PII data), thereby causing a high reliability score. In some embodiments, the score may be deemed higher since a password and SSN number may be weighted more than a name and birth date or address, which are easily identifiable from an Internet search.

In some embodiments, the score can depend on how many or how much of the PII referenced by the token actually matches the stored and secure PII data leveraged by engine 400 (e.g., credit bureau data). For example, if the consumer's token has a correct name and password, but not the correct SSN, then this may be cause for concern because a name and password can be easily obtained, while a SSN is generally held secure. Therefore, the reliability score may not be high and/or indicate the consumer is who he/she says she is. In some embodiments, even if the threshold is 2, for example, since the type of data (e.g., the SSN) is not accurate, a low or "false" reliability score may be relayed from engine 400 to entity 704/752.

Figure 8:
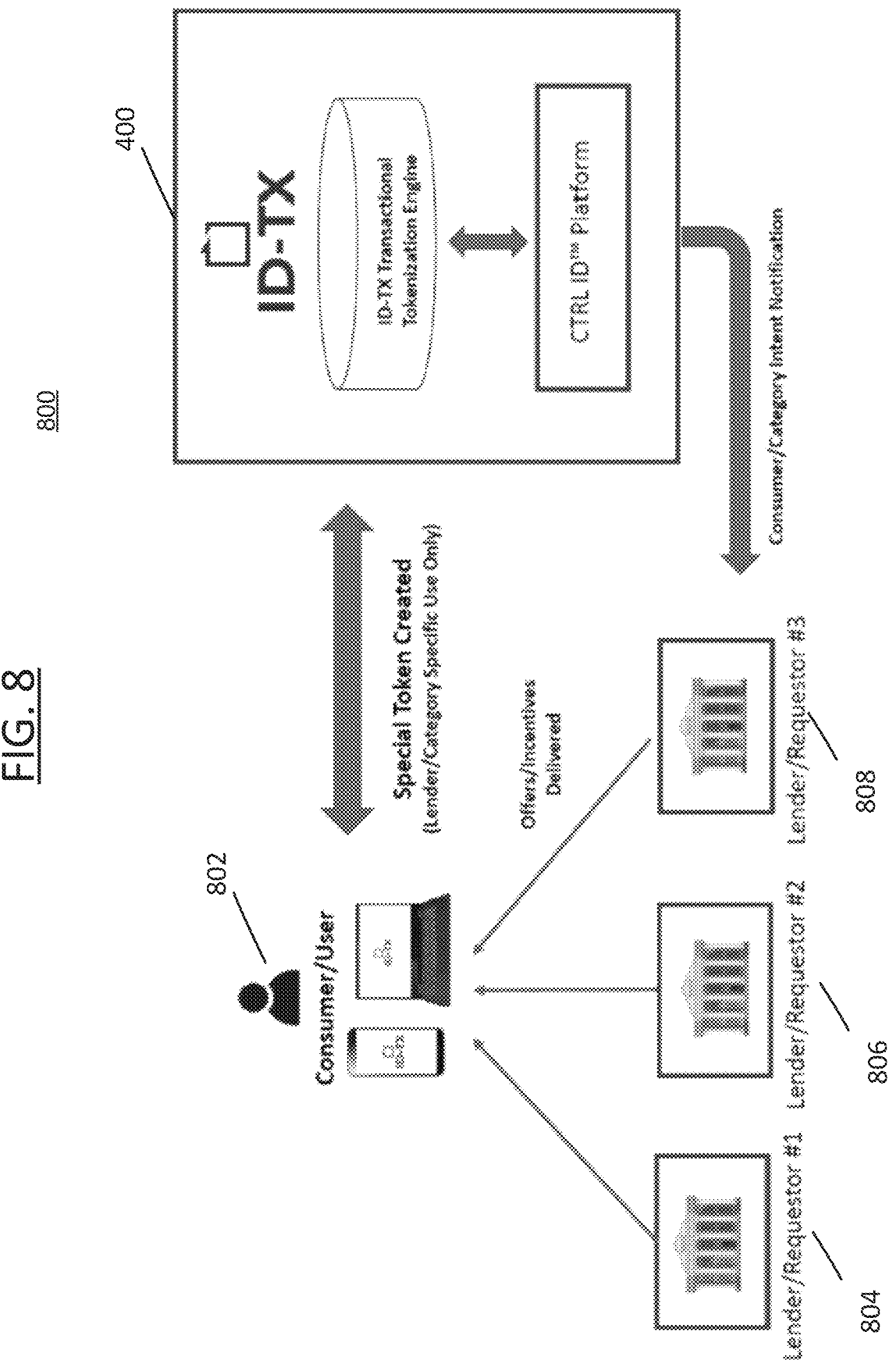
FIG. 8 provides a non-limiting example embodiment of on-demand token-generation according to some embodiments of the present disclosure.

FIG. 8 provides a non-limiting example embodiment of on-demand token-generation according to some embodiments of the present disclosure. FIG. 8 illustrates system 800, which includes consumer 802 (e.g., operating on a device as discussed above), engine 400 and third party entities 804-808 (e.g., referred to as lenders). While only three lenders 804-808 are displayed, this is for example purposes only, as any type and/or quantity of lenders can be utilized without departing from the scope of the instant disclosure.

System 800 illustrates an embodiment where a consumer 802 desires to interact with lenders 804, 806 and 808. In some embodiments, a special token can be created for each interact, each type of interaction, or a subset of interactions. For example, if interaction with lenders 804 and 806 is for a loan, and the interaction with lender 808 is for property transfer, then engine 400 can create two tokens: one for the interaction with lenders 804 and 806, and another for the interaction with lender 808. In some embodiments, the token can be transaction based, as the type of information required for type of transaction can be identified and compiled within the token for verification by a specific type of lender.

In some embodiments, the special token can provide identifying information for lender use only and can provide category specific information. Thus, in some embodiments, as mentioned above, tokens can be specific to particular lenders. For example, using the above example for lenders 804 and 806, rather than have a single token for the loan transactions, individual tokens for the transactions with lender 804 and lender 806 can be created by engine 400.

Some embodiments can leverage consumer intention and data to provide lead generation, and value-added services to both consumers and lenders (CTRLD™ ID Platform). Some embodiments can provide a new effective, secure layer within traditional structural models, and a true bridge to secure federal sponsored transactional identity.

In some embodiments, the consumer and category intent notifications can be sent by engine 400 to the lender 804-808. In some embodiments, such notifications can alert a lender that the user is requesting a specific type of on-demand token with the intention of subsequently executing a transaction with that lender. This can enable the lender to streamline the transaction process by readying its system for the expected transaction. In some embodiments, the lender 804-80 can provide offers and deliver incentives back to the consumer 802.

In some embodiments, use of the engine 400 can provide a consumer 802 with strong security, control, and true usage command. In some embodiments, the system 800 can provide the consumer with transaction convenience, speed and efficiency, and enhanced commerce, offers, and pricing optimization. In some embodiments, the system 800 can provide the consumer with usability and Signiant immediate real-world value.

In some embodiments, the system 800 can provide lenders 804-808 with speed, efficiency, and strong transactional security. In some embodiments, the system 800 can provide lenders 804-808 with pre-vetted, know your customer, and qualified transactions. In some embodiments, the system 800 can streamline enrollment and provide greater conversion and revenue for lenders and/or authentication requestors. In some embodiments, the system 800 can minimize social security data risk and provide real transactional integrity.

In some embodiments, the system 800 (e.g., engine 400) can leverage true value of company platforms (for example, credit file) while addressing real risks of social security number transactional reliance. In some embodiments, the system 800 can drive additional revenue via existing platform assets. In some embodiments, the system 800 can maintain BE position in commerce ecosystem, and enable front end and transactional value creation.

In some embodiments, new mobile, authentication, tokenization platform solutions can be focused fundamentally on closed-loop identity and authentication models. In some embodiments, the credit bureaus report can be too vital and interatrial to economy, for example, improvement and layered VAS is critical and needed. In some embodiments, there can be significant friction and weak security in all current FI and credit utilization models.

In some embodiments, key requirements can comprise strong and secure platform capabilities with new authentication credential methodologies. Some embodiments comprise integrate and leverage existing credit and bureau centric models, while adding significant additional value.

Some embodiments can remove key friction issues with client onboarding, and application processes. Some embodiments can apply critical removal and devaluation of legacy fixed identifiers, for example, Social Security Numbers and the like. Some embodiments can add value and increased commercial utility to all ecosystem participants (consumers, credit and lenders, service providers and the like).

In some embodiments, a credit bureau file data and/or information, and related reports can be requested by the transactional identity system and server. In some embodiments, a full and complete credit report request from the bureaus can use APIs and/or web services. In some embodiments, data can be sent to the requestors from the transactional identity system and server via API and/or web services.

Figure 9:
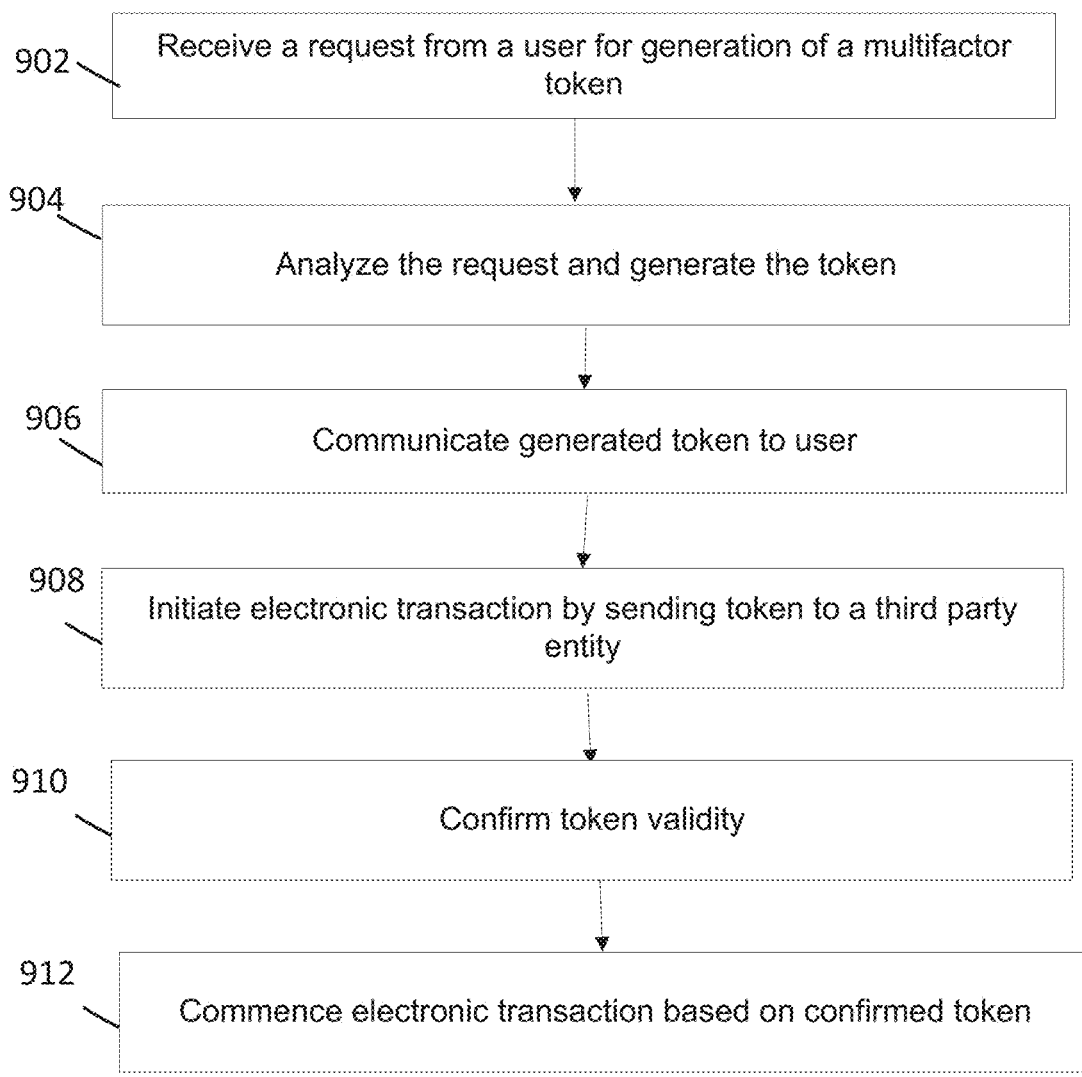
FIG. 9 is a flowchart detailing a non-limiting example embodiment according to some embodiments of the present disclosure.

Turning now to FIG. 9, Process 900 details a non-limiting embodiment according to some embodiments of the instant disclosure for generating a token for a user for use in an electronic transaction with a third party lender (e.g., as discussed above in relation to at least FIGS. 5-8).

According to some embodiments of Process 900, Steps 902 and 908 are performed by request module 404 of transaction engine 400; Steps 904 and 906 are performed by token module 402; Step 910 is performed by determination module 406; and Step 912 is performed by output module 408.

Process 900 begins with Step 902 where a request for a multifactor token is received. In some embodiments, the request can originate by input from a user. In some embodiments, engine 400 can detect that a transaction is impending (e.g., based on network traffic of a user), and automatically generate the request for the token.

In some embodiments, as discussed above in relation to FIGS. 5-8, the request can include information related to, but not limited to, a user, a transactional intermediary, the other party in the transaction (e.g., the promisor/promisee), a type of transaction, an amount or consideration for the transaction, and the like, or some combination thereof. In some embodiments, the request can be encrypted, and/or encoded with any type of known or to be known encoding that protects a user's PII.

In Step 904, engine 400 receives the request and generates the token, as discussed above in relation to at least FIG. 6. In some embodiments, Step 904 can involve engine parsing the request, and analyzing the request and the information included therein, and generating a token based therefrom. For example, as discussed above in relation to at least FIGS. 6 and 8, a token can be lender specific and/or specific to a type of transaction.

In some embodiments, the token comprises PII data for a user, and is only viewable or accessible by engine 400 or the party engine 400 exposes the data to. In some embodiments, the token is a key for locating data stored on a network location hosted and protected by engine 400.

In some embodiments, engine 400 stores and holds in abeyance from any party (e.g., does not reveal unless properly requested) the decryption key for exposing the data of the token. Thus, in some embodiments, engine 400 maintains and protects the PII data of the user and leverages this control to validate user identity in advance of or during electronic transactions.

In some embodiments, the analysis performed by engine 400 in Step 902 can involve any type of known or to be known computational analysis technique, including but not limited to, vector analysis, data mining, computer vision, machine learning, neural network, artificial intelligence, and the like, or some combination thereof.

In some embodiments, engine 400 can execute any type of known or to be known multifactor token generation technique or technology, including, but not limited to, cryptographic algorithms for generating security tokens, for example.

In some embodiments, a plurality of tokens can be generated. In some embodiments, a subset of the plurality of tokens comprise particular types of data in order to ensure that if one or a subset of tokens is hacked, the unhacked tokens still securely maintain the PII data of the user. While the discussion herein will focus on a single token being generated and leveraged for executing an electronic transaction, it should not be construed as limiting, as it should be understood that multiple tokens can be utilized without departing from the scope of the instant disclosure.

In Step 906, engine 400 communicates the generated token to the user for use in a subsequently performed and/or interacted with electronic transaction. As discussed above, such communication can include, but is not limited to, sending and storing the token on a device(s) of the user, sending and storing the token in association with an account of the user (e.g., storing the token in association with the user's financial accounts or mail accounts, and the like), and/or storing the token in a network hosted cloud storage location for retrieval from any device, and the like, or some combination thereof.

In Step 908, having a generated token, an electronic transaction is initiated. In some embodiments, the initiation of the transaction in Step 908 can cause the request from Step 902 to be generated, as discussed above in relation to the on-demand embodiments of system 800 of FIG. 8.

In some embodiments, initiation of the electronic transaction involves identifying a type of transaction, a third party (e.g., lender or requestor), as discussed above, and the like. In some embodiments, Step 908 involves presentation of the token by the user. In some embodiments, such presentation involves creating and sending a copy or version of the token, or exposing it to the third party over the network for evaluation. In some embodiments, a pointer or network location to the token can be provided so that the third party can evaluate it, as discussed below.

For example, Step 908 can involve a user requesting a loan from a bank; therefore, rather than submitting an application with filled out application forms with PII, the user can send his/her token.

In some embodiments, Step 908 can be a result of a credit or identity monitoring task being operated and/or implemented by engine 400 on a network so as to ensure a user's identity is not stolen or misappropriated. Thus, Step 908 can involve identifying a requested transaction, and executing the evaluation of it accordingly.

In Step 910, the validity of the token is confirmed. In some embodiments, the confirmation operation involves engine 400 receiving from a lender (that received the token from the user in Step 908), and analyzing it to determine its veracity regarding the user's identity. As discussed above in relation to at least FIGS. 5-8, engine 400 can decrypt the token, compare it to known PII data of a user (e.g., credit bureau data), and output a result that indicates whether the token accurately represents the user and a reliability score. In some embodiments, as discussed above, the confirmation of Step 910 can include lender receiving credit and PII data related to the user.

In some embodiments, the analysis can be performed in a similar manner as discussed above in relation to Step 904; for example, executing an MFA algorithm to decrypt the token, then executing a computational analysis technique, including but not limited to, vector analysis, data mining, computer vision, machine learning, neural network, artificial intelligence, and the like, or some combination thereof, on the exposed token data and metadata.

In some embodiments, if the token is not confirmed, or as mentioned above, the reliability score is below a threshold value, then the initiated electronic transaction is halted.

In Step 912, upon conformation of the token's validity, the transaction is enabled and is commenced based on the confirmed identity of the user. In some embodiments, engine 400 can operate as an intermediary for the transaction. In some embodiments, engine 400 can facilitate communication between parties of the transaction so as to ensure the veracity, viability and security of the PII data being exchanged.

In some embodiments, as discussed above in relation to at least FIG. 8, third party content included, but not limited to, advertisements, incentives, offers and the like, can be provided to the user for use during the transaction and/or other transactions.

As discussed herein, reference to an "advertisement" should be understood to include, but not be limited to, digital media content embodied as a media item that provides information provided by another user, service, third party, entity, and the like. Such digital ad content can include any type of known or to be known media renderable by a computing device, including, but not limited to, video, text, audio, images, and/or any other type of known or to be known multi-media item or object. In some embodiments, the digital ad content can be formatted as hyperlinked multi-media content that provides deep-linking features and/or capabilities. Therefore, while some content is referred to as an advertisement, it is still a digital media item that is renderable by a computing device, and such digital media item comprises content relaying promotional content provided by a network associated party.

Any of the operations described herein that form part of the disclosure are useful machine operations. The disclosure also relates to a device or an apparatus for performing these operations. The apparatus can be specially constructed for the required purpose, such as a special purpose computer. When defined as a special purpose computer, the computer can also perform other processing, program execution or routines that are not part of the special purpose, while still being capable of operating for the special purpose. Alternatively, the operations can be processed by a general-purpose computer selectively activated or configured by one or more computer programs stored in the computer memory, cache, or obtained over a network. When data is obtained over a network the data can be processed by other computers on the network, e.g. a cloud of computing resources.

Some embodiments can also be defined as a machine that transforms data from one state to another state. The data can represent an article, that can be represented as an electronic signal and electronically manipulate data. The transformed data can, in some cases, be visually depicted on a display, representing the physical object that results from the transformation of data. The transformed data can be saved to storage generally, or in particular formats that enable the construction or depiction of a physical and tangible object. In some embodiments, the manipulation can be performed by a processor. In such an example, the processor thus transforms the data from one thing to another. Still further, some embodiments include methods can be processed by one or more machines or processors that can be connected over a network. Each machine can transform data from one state or thing to another, and can also process data, save data to storage, transmit data over a network, display the result, or communicate the result to another machine. Computer-readable storage media, as used herein, refers to physical or tangible storage (as opposed to signals) and includes without limitation volatile and non-volatile, removable and non-removable storage media implemented in any method or technology for the tangible storage of information such as computer-readable instructions, data structures, program modules or other data.

Although method operations can be described in a specific order, it should be understood that other housekeeping operations can be performed in between operations, or operations can be adjusted so that they occur at slightly different times, or can be distributed in a system which allows the occurrence of the processing operations at various intervals associated with the processing, as long as the processing of the overlay operations are performed in the desired way.

It will be appreciated by those skilled in the art that while the disclosure has been described above in connection with particular embodiments and examples, the disclosure is not necessarily so limited, and that numerous other embodiments, examples, uses, modifications and departures from the embodiments, examples and uses are intended to be encompassed by the claims attached hereto. The entire disclosure of each patent and publication cited herein is incorporated by reference, as if each such patent or publication were individually incorporated by reference herein. Various features and advantages of the disclosure are set forth in the following claims.

What is claimed is:

1. A method comprising:
    receiving, over a network by a device, a request to generate a token for a user, the request comprising personally identifiable information (PII) data related to the user;
    analyzing, by the device, the request, and generate the token, the token being encrypted;
    communicating, over the network by the device, the generated token for storage in association with a network location of the user;
    determining a PII data type weighted reliability score for an identity of the user and the token wherein a private PII data type weight is higher than a public PII data type;
    initiating, by the device, an electronic transaction between the user and a third party entity by receiving, over the network, from the third party entity, information related to the token;
    analyzing, by the device, the token information, and determining validity of the token in relation to an identity of the user; and
    facilitating, by the device over the network, the electronic transaction between the user and the third party entity based on the validity determination.

2. The method of claim 1, further comprising:
    parsing the request, and analyze the PII data; and
    determining veracity of PII data in relation to the identity of the user, wherein the veracity determination comprises comparing at least a portion of the PII data to a credit bureau data.

3. The method of claim 1, further comprising:
    storing, in a database, a decryption key for the token, wherein the storage is accessible only by a processor, wherein the analysis of the token is based on decryption of the token via the decryption key.

4. The method of claim 1, wherein the validity determination comprises:
    comparing PII data included in the token to hosted and verified PII data of the user; and
    determining a reliability score for the identity of the user and the token based on the comparison.

* * * * *